UNITED STATES PATENT OFFICE.

HEINRICH VON HOCHSTETTER, OF CONSTANCE, GERMANY.

PROCESS OF MAKING FORMALDEHYDE.

1,100,076.  Specification of Letters Patent.  Patented June 16, 1914.

No Drawing.  Application filed January 9, 1913.  Serial No. 741,106.

*To all whom it may concern:*

Be it known that I, HEINRICH VON HOCHSTETTER, a subject of the Emperor of Austria-Hungary, and a resident of the city of Constance, Baden, Germany, have invented certain new and useful Improvements in the Process of Making Formaldehyde, of which the following is a full, clear, and exact description.

The present invention relates to the production of formaldehyde from methyl-alcohol by conducting the vapors of the latter together with an admixture of air over certain contact substances or catalysts.

Copper is the catalyst usually employed for effecting the oxidation of methyl-alcohol into formaldehyde by means of air and recently silver also has been resorted to because of the better yield obtained by the employment of this latter metal. In the endeavor to obtain a perfect yield, other factors affecting the yield, have been given close attention, such as the influence of the proportion of methyl-alcohol and oxygen relative to each other as well as the temperature of the process; the research has been extended to the influence exerted by the presence of nitrogen and water-vapor in the alcohol-air mixture, but no solution of the problem which gives the control of the process into the hands of the operator, has hitherto been obtained by any of the many proposals advanced.

The process constituting the subject-matter of the present invention was arrived at by making the assumption that the formation of formaldehyde is not a simple reaction but is more complicated than has generally been accepted, such formation being brought about by various reactions going on simultaneously and independently of each other, one reaction being a regular oxidation, while the other consists in splitting off hydrogen from the molecule, the reactions being represented by the following equations respectively, viz:

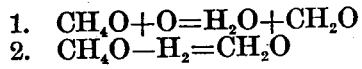

1. $CH_4O + O = H_2O + CH_2O$
2. $CH_4O - H_2 = CH_2O$

This assumption was extended and was later on substantiated by certain experiments which gave surprising results and although, at present, it satisfactorily explains the possible status of the reactions, it is by no means claimed that it represents the only true cause of the successful working of the process as other factors, yet unknown, may also contribute to the attaining of the purpose in view. Even if my assumption is correct, I cannot state specifically at present, whether both of the reactions have an equal share in the outcome of the process. The above assumption, however, that two reactions, so different in their character, might go on simultaneously and perhaps independently of each other, lead to the subsequent investigation of the question whether a single uniform substance, either a metal or a uniform chemical compound, was the best catalytic means to perform the two so greatly varying reactions, and it was believed that the employment of a plurality of metals, etc., as a catalyst might be of greater advantage than the use of exclusively one metal for this purpose. This logical conclusion was tested by experiments and was substantiated by most surprising results.

In practising my process I usually employ two metals or chemical compounds in a "system"; it is still an open question as to which one of the two the specific effect on the methyl alcohol-air mixture is to be attributed; *i. e.* which of the two components of the system causes the oxidation or splitting off of hydrogen respectively, but this one fact clearly stands out, viz., that a suitable selection of the components of the system to serve as a catalyst, whether the components of the system are two or more in number, gives a yield of formaldehyde closely approaching the theoretical yield in a most desirable way.

The following illustration serves for a better understanding of my process: By the present method of making formaldehyde a mixture of air and methyl alcohol vapor is passed over copper acting as a catalyst, whereby only a moderate yield of formaldehyde is obtained. If the conditions under which the copper process is carried on, are left unchanged and only the copper metal substituted by silver, a somewhat more satisfactory yield is obtained but still much less than the theoretical, whereas a substitution by a plurality of metals turns out a perfect yield. A combination of metals displaying such higher merits as a catalyst for the manufacture of formaldehyde from methyl alcohol is, for instance, the combination of silver and copper, or silver with a trace of any of the metals of the platinum group.

Further investigation along the line indicated by the facts disclosed above will easily disclose other metals, each of which, combined with another metal or with a plurality of metals will produce a system displaying higher merits as a catalyst than a single metal or chemical compound; there will also be found a considerable number of chemical compounds, which, combined with others or in combination with metals, will achieve the purpose in view.

Another example of making formaldehyde according to my process from a mixture of air and methyl alcohol vapor consists in conducting said mixture through a heated copper tube containing metallic silver in any form suitable for the process.

Still another example consists in the employment of metallic silver on which metallic rhodium has been precipitated, the combination thus obtained representing a system giving most satisfactory results and also demonstrating that the mechanical features of the system may be greatly varied without departing from the spirit of my invention.

What I claim and desire to secure by Letters Patent is:

1. The process of making formaldehyde consisting in conducting a mixture of air and methyl alcohol vapor at a suitable temperature over a catalyst comprising a plurality of catalytic substances, the vapor mixture being caused to contact with each of said substances.

2. The process of making formaldehyde consisting in conducting a mixture of air and methyl alcohol vapor at a suitable temperature over a catalyst comprising a plurality of catalytic metals in any proportions, the vapor mixture being caused to contact with each of said metals.

3. The process of making formaldehyde consisting in conducting a mixture of air and methyl alcohol vapor at a suitable temperature through a tube of catalytic metal containing another catalytic metal in a suitable form, the vapor mixture being caused to contact with each of said metals.

4. The process of making formaldehyde consisting in conducting a mixture of air and methyl alcohol vapor at a suitable temperature over a catalytic metal on which another catalytic metal has been precipitated, the vapor mixture being caused to contact with each of said metals.

5. The process of making formaldehyde consisting in conducting a mixture of air and methyl alcohol vapor at a suitable temperature through a copper tube containing metallic silver in a suitable form, the vapor mixture being caused to contact with each of said metals.

In testimony whereof I have signed this specification in the presence of two subscribing witnesses.

HEINRICH von HOCHSTETTER.

Witnesses:
 MILO A. JEWETT,
 JACOB SCHMIDT.